Oct. 2, 1956

B. C. W. HAGELIN 2,765,364

KEYING MECHANISM

Filed Oct. 5, 1950

INVENTOR
BORIS CAESAR WILHELM HAGELIN

Moore & Hall
Attys.

Oct. 2, 1956 B. C. W. HAGELIN 2,765,364
KEYING MECHANISM
Filed Oct. 5, 1950 11 Sheets-Sheet 10

INVENTOR
BORIS CAESAR WILHELM HAGELIN

By Moore & Hall
Attys.

Oct. 2, 1956  B. C. W. HAGELIN  2,765,364
KEYING MECHANISM
Filed Oct. 5, 1950  11 Sheets-Sheet 11
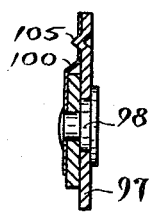
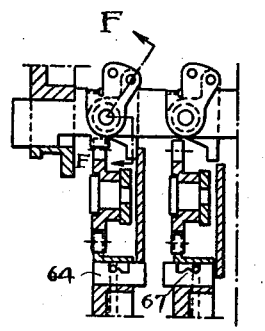
INVENTOR
BORIS CAESAR WILHELM HAGELIN

United States Patent Office 2,765,364
Patented Oct. 2, 1956

2,765,364

KEYING MECHANISM

Boris Caesar Wilhelm Hagelin, Zug, Switzerland

Application October 5, 1950, Serial No. 188,546

26 Claims. (Cl. 178—22)

The present invention concerns a new keying mechanism for cryptographic devices. The invention represents a novel approach to the problem of keying.

United States Patent Number 2,394,765, granted to me February 12, 1946, for a ciphering telewriter presents the background over which the new advance disclosed herein is made. It will be noted however that the invention may be incorporated as a keyer in many forms in a wide variety of cryptographic devices such as Hebern, Enigma and the like, and is not confined to any one such device.

It is an object of the invention to provide displacement keying means for controlling the modification of code combinations.

It is an object of the invention to provide a displacement keyer for cryptographic devices which determines the interaction between slide bar drums and individually displaced key wheels.

It is an object of the invention to provide a displacement keyer for cryptographic devices which determines the interaction between slide bar drums and individually disposed secondary key wheels which control main key wheels.

Most main key wheels as used herein are event sequence means comprising toothed wheels having preferably a prime number of teeth and an indicia carrying flanging on which may be impressed the letters of the alphabet or the like. A series of holes equal in number to the number of teeth carry pins which are spring biased to one of two positions, projecting or non-projecting. The present invention may employ a plurality of key wheels, five being discussed. It will be understood that the key wheels are alike save that each has a different number of teeth and pins. These numbers should not have a common denominator and preferably are primes.

Secondary key wheels are pinions or spur gears which are acted upon by the code bar drum and in turn act upon the main key wheels.

A code bar drum functions somewhat as a variable toothed gear composed of a changeable collections of ciphering elements which may be termed a cipher store and comprises two slotted discs mounted for rotation with bars axially slidable in peripheral slots in the discs. Each bar carries one or more lugs which are acted upon to slide a bar longitudinally so as to produce a projection on the side of one of the slotted discs. In this way the slide bars are brought into active position and a variable toothed gear wheel is produced which may act in a continually variable manner. While one code bar drum is shown in combination with a plurality of main key wheels, two drums or when construction permits an individual drum for each main key wheel may be used.

It is an object of the invention to provide a ciphering device with elements which act upon each other and react whereby the chain of kinematic events is greatly increased and the repetition cycle is made very long.

One application of the present composite keying device may be made as improvements to structures shown in Figs. 1–6b, of Patent Number 2,394,765. For example, Fig. 1 of the patent discloses a key board combination shown in Figs. 1 and 2 of the present application as bar 1a having spaced notches with sloping walls in its lower side. When the well known elemental five unit alphabet or composite letter system is used, five key board combination bars such as 1a will be provided, each with a different sequence of notch spacing in its lower side. Combination bars 1a are actuated by the vertical movement of key board levers 2a which act against the sloping walls of the notches in bars 1a. Where a standard teletypewriter key board is used there will be thirty-two levers 2a each corresponding to a letter of the alphabet or other symbol. Each of the keyboard levers 2a acts upon from one to five of the key board combination bars 1a, depending upon the character which determines the spacing of the notches on the underside of the bars 1a. With the actuation of each separate lever 2a by its corresponding key board key, certain of the bars 1a are pushed to the left into active position and certain others are pushed to the right into inactive position or are permitted to remain where they are. A different arrangement of the bars 1a is caused by each of the levers 2a. A bell crank 3a is fixed to shaft 6a and carries a pin in its free end which slides in a slot in a link 14a. Bar 1a is provided with a projection or lug 4a on its upper surface and link 14a is provided with a similar projection or locking tooth 5a on its lower surface. Link 14a is pinned to one end of lever 15a which is biased counter-clockwise about its pivot by tension spring 17a.

Bell crank 3a has an upstanding arm 7a provided with a cam follower projection 8a which bears against and is spring biased toward a continually rotating timing cam 10a. Cam 10a is provided with a long dwell and a single recess 11 arranged to receive projection 8a of bell crank 3a. It will be seen that cam follower projection 8a may enter recess 11a under the action of its spring bias only when lug 4a and locking tooth 5a are not in conjunction. That is when key board combination bar 1a and link 14a both occupy a left or right position locking tooth 5a is positioned above lug 4a and combination modifying link 14a is held against clockwise rotation, holding bell crank 3a in turn against counter clockwise rotation. On the other hand when bar 1a and link 14a are in opposite positions, one right and the other left, link 14a may move down and bell crank 3a rotate under the action of its bias spring as tooth 5a clears lug 4a.

A lever 26a is fastened to and turns with shaft 6a and is provided with a projection which bears against printer basket combination bars 25a of which there are five corresponding to bars 1a. Each bar 25a is biased toward lever 26a by tension spring 31a with movement to the left limited by a suitable stop. Thirty-two printer basket bars 40a are positioned above the notched upper surfaces of printer basket combination bars 25a. Any given combination of right or left positions of the five printer basket combination bars 25a under the action of their respective levers 26a will select a desired character to be printed as the coded counterpart of each key board lever 2a and the character controlling it.

The cam discs 16a and others of the above patent are replaced in one form of the invention by secondary key wheels to which the upper cam follower end of lever 15a responds under the action of its biasing spring 17a.

In another form of the invention main key wheels with selectively active pins are mounted to act on the upper cam follower ends of the five levers 15a, one main key wheel for each lever. As mentioned above each key wheel has a gear the number of teeth of which correspond to the number of adjustable pins, each number is different and they have no common denominator. The action of the main key wheels on the levers 15a and the combination modifying links 14a is a function of the number of pins which project into active extended position. Of course, in operation the number and distribution of actively extended pins should be chosen at random and the distribution on the various wheels should not be related.

A pinion or intermediate wheel meshes with the teeth of each main key wheel. All five pinions are keyed to a shaft with a gear which is acted upon in turn by the slide bars of the main slide bar drum. Where two code bar drums are employed the pinion shaft is divided with three pinions and a drive gear on one shaft portion and two pinions and another drive gear on the other shaft portion. The two drive gears are driven independently by the different projecting ends of the slide bars which have been pushed into active position.

The slide bars on the main drum may be provided with two sets of teeth, one for the right hand code bar drum. A slide bar in its normal position will not act on the right hand code bar drum, but will act on the left hand code bar drum by means of special lugs. When a slide bar is moved to the left by the action of an active pin on a main key wheel it will act on the right hand code bar drum, but not on the left hand code bar drum. The teeth on the slide bars are preferably arranged differently and certain teeth may be omitted all together. It is important that the displacement series for the two code bar drums should be different. The use of two code bar drums facilitates having three or more different advancement rates or patterns for the key wheels i. e., no step, one step and two steps. As all the necessary movement combinations number three to the sixth power or seven hundred thirty-nine, it is sometimes easier not to obtain them all with one drum. Using two drums with three cubed or twenty seven bars each, all the combinations are obtained in a simple manner. Twenty-six bars can be used to advantage.

A variable event adjustment means comprising a guide arm is pivoted on the frame between the slide bar drum and each main key wheel and has an extension which is acted upon by the active pins of the main key wheel. The other end of the guide arm acts upon lugs on the slide bars which if so placed will move the bars to the left. The key wheels act through their respective guide arms by means of the active and inactive pins to move certain slide bars into active positions where they will project as teeth and displace the key wheels through the drive gear and pinions above. It will be seen that the drive gear rotates all the pinions on its shaft and therefore all the key wheels in mesh with the pinion and the guide arm of one key wheel acting in response to its active pins will move slide bars which will displace one or several other key wheels. The guide arms may be regarded as having active or inactive positions depending upon whether or not they have been acted upon by a key wheel pin.

Another modification comprises a slide bar drum, individually displaced main key wheels and individually displaced secondary key wheels controlling the main key wheels. A feature of this construction is the provision of ratchet levers which are positioned by the pins of the secondary key wheels at high, medium or low level by corresponding positions of the pins. The ratchet levers act on the main key wheel ratchets to advance each main key wheel independently zero, one or two steps depending upon whether the secondary key wheel pins are in high, medium or low position.

The above discussion of the application of the invention is illustrative of certain forms and uses of the invention and is not intended to be limiting. It will be clear that the composite displacement keyer unit is independent of the particular apparatus it may control and is therefore applicable to a wide range of apparatus to be controlled.

Reference is made to the drawings for detailed showings of one form of keyer structure as used with selected apparatus to be controlled. The various figures are to be taken as illustrative and not as limiting. Like numerals refer to like parts throughout.

Fig. 11 is a plan view with part in section, showing slide bar construction with movable projections.

Fig. 12 is a sectional view of the key-wheel pin mountings.

Fig. 13 is a detailed sectional view showing the slide bars in their left or displaced position on the code bar drum.

Fig. 14 is a sectional view taken along line F—F of Fig. 12.

Figure 3:
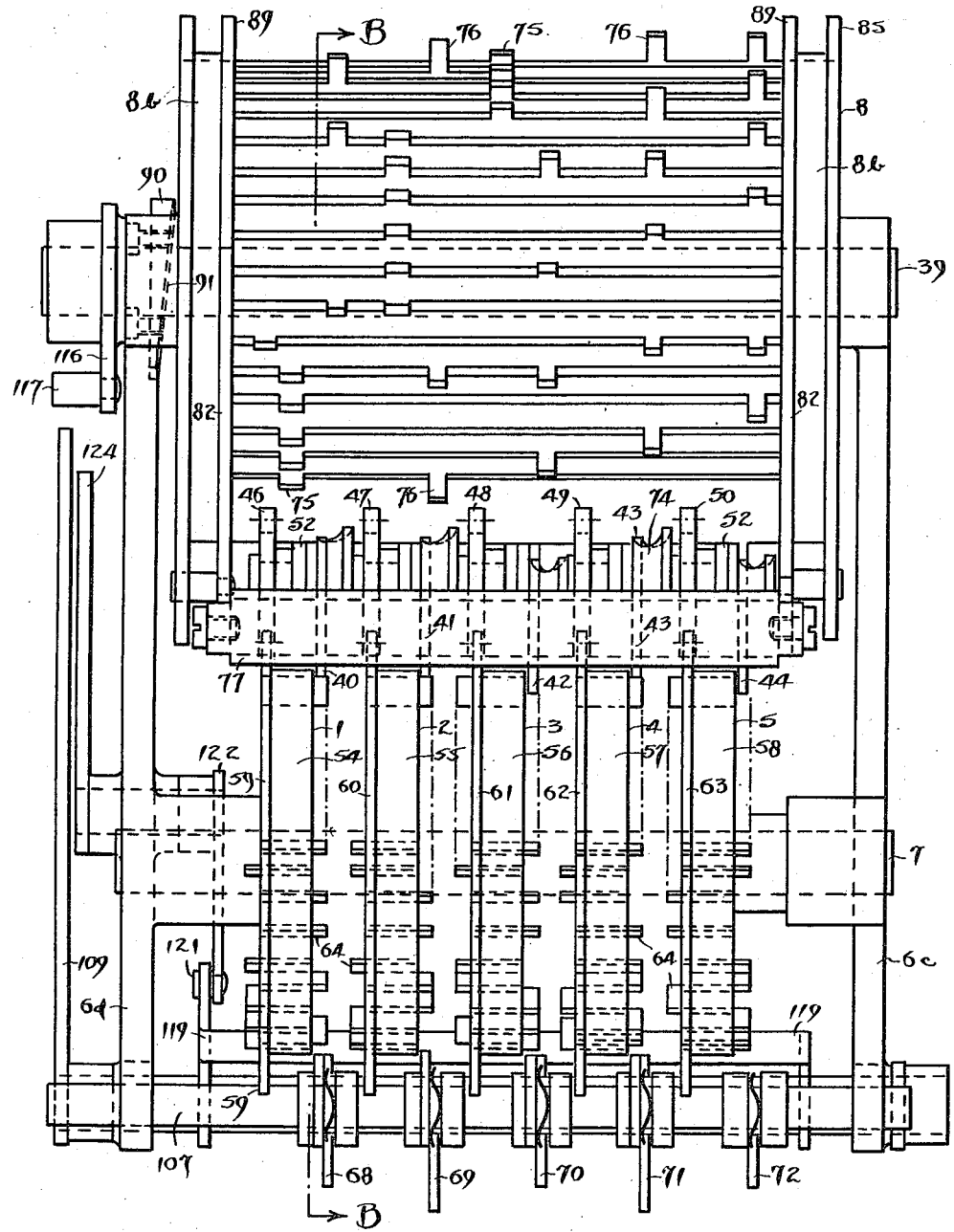
Fig. 3 is a plan view of the improved keyer.

Five key wheels 1, 2, 3, 4 and 5 are mounted on a shaft 7 journaled in suitable bearings in member 6c of frame 6 as shown in side by side relation in Fig. 3. Frame 6 is shown as having a base member 6b and two pairs of upright bearing members 6c and 6d. The frame 6 and its various parts may be enclosed in a case or when the invention is made portable the frame 6 may itself form part of the enclosing case. Although compactness can be important and is usually desirable servicing requirements as well as ease of original assembly suggest screwing or bolting the base member 6b to the inside of a metal protective case from which it can be readily removed when necessary.

Key wheels 1 through 5 are free to turn on shaft 7 and face a slide bar drum 8 mounted on a parallel shaft 39 journaled in upright 6d. Drum 8 comprises two end discs 8b which are radially slotted at their peripheries to slidably mount a number of slide bars 9 through 38 inclusive. Shaft 39 is connected to the operating mechanism such as a crank or motor by a clutch of suitable design and is keyed to drum 8.

Key wheels 1 through 5 comprise metal discs having flanges 54 through 58, respectively, beyond which project the teeth of spur gears 59 through 63, respectively. Each disc is radially slotted within the circle formed by flanges 54 through 58 to mount pins 64 which project longitudinally either to the right or to the left parallel to shaft 7. When pins 64 project to the right they extend beyond the edges of flangings 54—58. When projecting to the left they are within the overhanging edge of the flanges 54 through and extend beyond the discs in which the pins 64 are mounted. The peripheral edges of the discs of wheels 1 through 5 which extend beyond flanges 54 through 58, are milled to form spur gears 59 through 63, respectively.

The number of pins 64 in each key wheel 1, 2, 3, 4 and 5 is the same as the number of teeth in the corresponding gear 59 through 63. As discussed above these numbers should have no common denominators and are preferably primes. As shown in Fig. 12, pins 64 may be provided with a slot 66 having two circular portions separated by a cusp or tooth 67. A spring extends into slot 66 and bears against one side or the other of tooth 67 and so holds the respective pins 64 in right or left position, operative and inoperative, respectively. Those pins 64 which protrude to the right may be called active pins.

Figure 5:
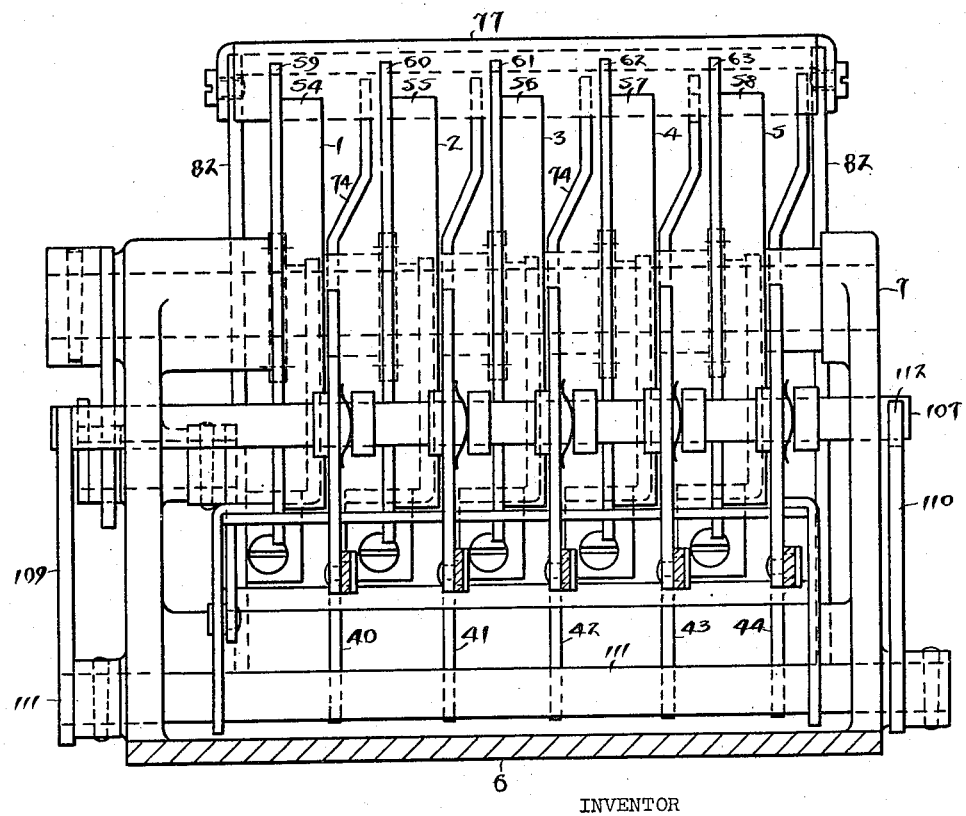
Fig. 5 is a section taken along line A—A in Fig. 1.

Between key wheels 1 through 5 and slide bar drum 8 is a shaft 45 on which are pivoted five guide arms 40 through 44 which are independently movable. Each guide arm 40 through 44 has a right projecting lug 73 which co-operates with the pins 64 of key wheels 1 through 5 under certain conditions and an oblique surface 74, shown clearly in Fig. 5, which co-operates with slide bars 9 through 38 inclusive. The guide arms 40 through 44 are provided with upstanding lugs 79 so that they may be locked in a right or left position by a locking bar 77.

Figure 4:
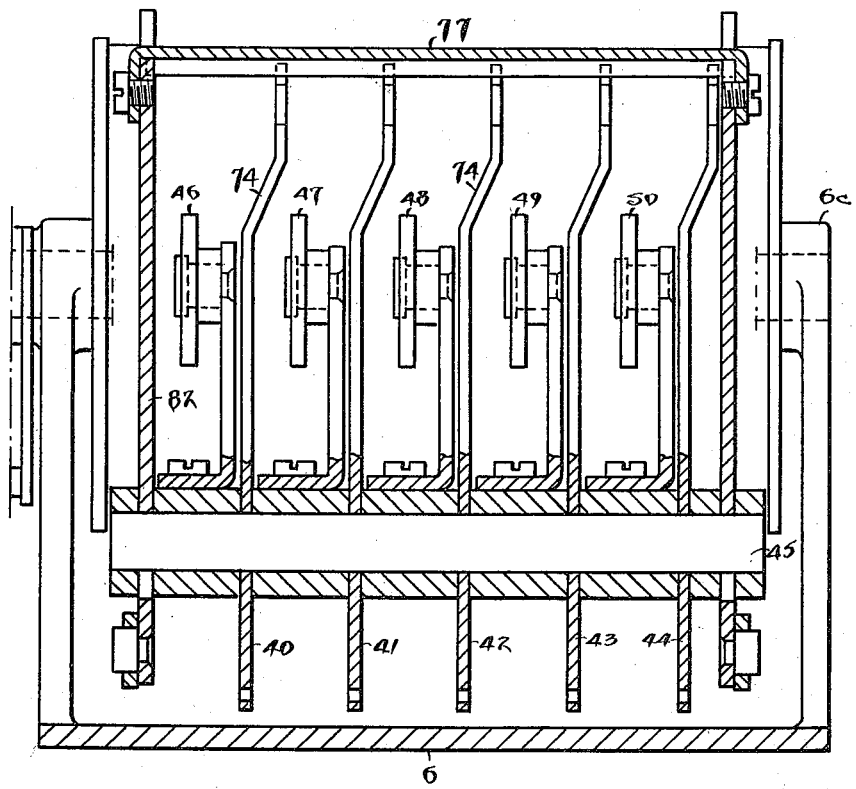
Fig. 4 is a front view of the improved device.

Adjacent the guide arms 40 through 44 are five intermediate gear wheels or pinions 46 through 50 which are independently journaled at 51 on brackets or angle arms 52 attached to bar 53 of frame member 6 adjacent shaft 45, each pinion corresponding to a key wheel. Bar 53 is slotted to receive guide arms 40 through 44. 52 indicates a double bracket support as may be seen in Figs. 4 and 5.

Figure 6:
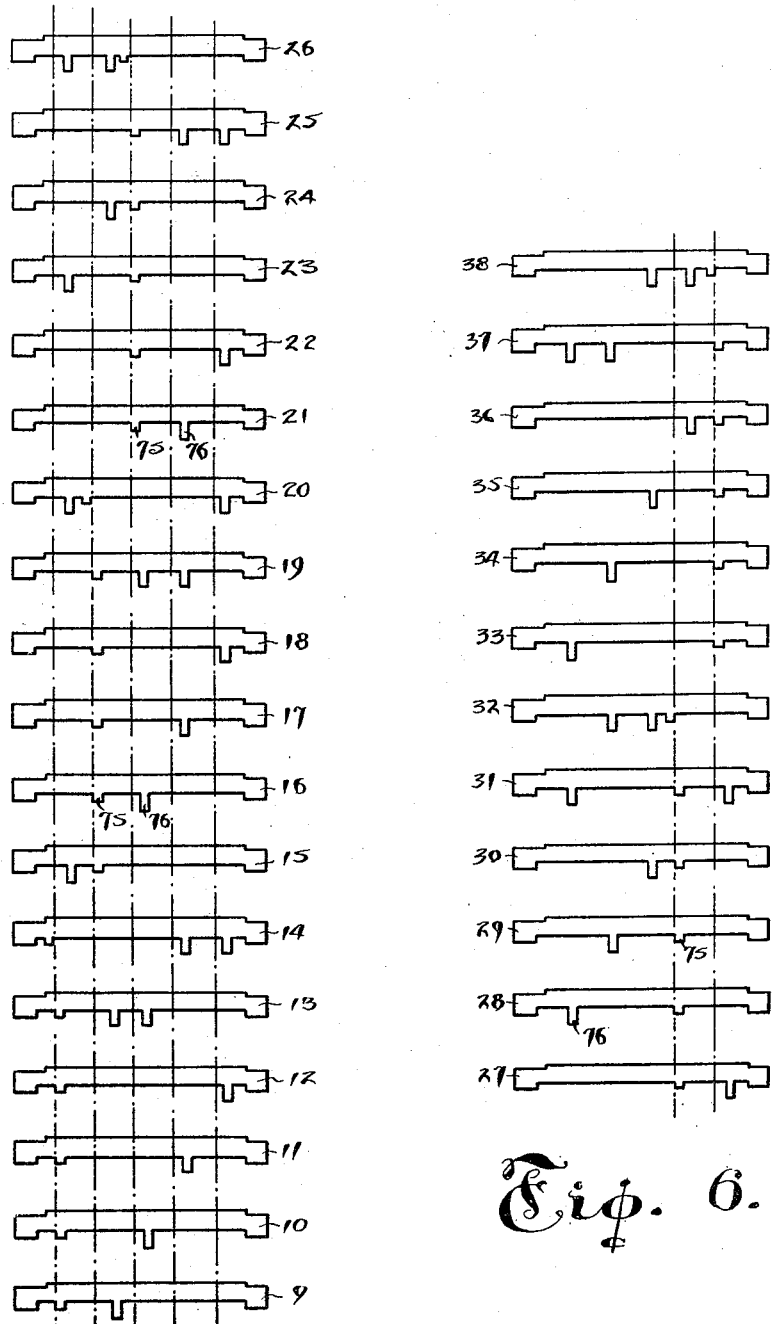
Fig. 6 is a detailed showing of slide bar construction in plan.

Fig. 6 shows thirty slide bars 9 through 38 carried by slide bar drum 8. Each slide bar 9 through 38 is provided with at least two projections. One kind of projection or lug 75 is short and acts as a driving tooth on the intermediate pinions or wheels 46 through 50 when drum 8 rotates, depending upon the relative positions of the lugs 75 and the pinions 46 through 50. In the present device each bar 9 through 38 is provided with only one short lug 75 as shown in Fig. 6. However, it is within the spirit of the invention to employ more than one lug 75 on each bar.

Each bar 9 through 38 is provided with a second kind of projection or lug 76 which in the present disclosure is longer than lug 75 and is employed singly or doubly on each slide bar. More may be used. Lugs 76 are designed to contact oblique guide surfaces 74 of those guide arms 40 through 44 which are in active position and cause selected slide bars to slide to the left as drum 8 rotates. Guide arms 40 through 44 may be regarded as having active or inactive positions with respect to slide bars 9 through 38 depending upon whether or not the guide arms are pivoted toward drum 8 to a position where cam surfaces 74 can act on lugs 76. Of course only those slide bars 9 through 38 will be moved to the left which have lugs 76 positioned to be acted upon by those guide arms 40 through 44 which are in active position.

From an inspection of Fig. 6 it will be seen that the positions of lugs 75 and 76 as a combination are different for each of the slide bars 9 through 38. As drum 8 turns all those slide bars which have been moved to the left by the action of active cam surfaces 74 are returned to the right undisplaced position by an obliterating bar 90 which has an oblique cam surface 91. Slide bars 9 through 14 have lugs 75 in the same relative position and each will rotate intermediate gear wheel or pinion 46 by one tooth when moved to the left into active position by those guide arms 40 through 44, respectively, which are rotated into active position toward drum 8 by the action of pins 64 of key wheels 1 through 5 upon projecting lugs 73.

Pinion 46 will be rotated zero to five tooth steps depending upon how many key wheels 1 through 5 have pins 64 in active position at the start of each rotation of drum 8.

As the key wheels 1 through 5, which determine the positions of guide arms 40 through 44 may be and usually are displaced by the action of lugs 75 on pinions 46 through 50 because of the action of cam portions 74 of guide arms 40 through 44 during the rotation of drum 8, some provision must be made to retain the guide arms in relative position during the complete displacement movement.

One form of retaining means for guide arms 40 through 44 is a U-shaped channel or locking bar 77 which extends across the tops of guide arms 40 through 44 and is provided with a leading longitudinal edge or depending flange 80 formed by the front wall of the channel and a back longitudinal edge 81 formed by the rear wall of channel 77. Locking bar 77 is carried by two side arms 82 mounted on shaft 45 and slotted as at 83 to permit movement in the vertical direction. Locking bar 77 may also be pivoted about shaft 45 through a small angle. In this way it can co-operate with the projections 79 on guide arms 40—44 to lock the guide arms in active or inactive position as may be determined by the interrelations between the various projections 73 and pins 64 concerned. The position of locking bar 77 is controlled by the bell crank 84 having a follower 84b which bears against cam 85 formed on the periphery of end discs 8b of drum 8. A continuation 86 of side arms 82 is pinned or linked with suitable lost motion to lever 87 which has a projection 87b bearing against cam 89 on drum 8. Levers 84 pivot arms 82 about shaft 45 and produce the forward and backward motion of locking bar 77. Levers 87 produce the up and down motion of bar 77, provision for which is made by slot 83, by action on continuation 86. Cams 85 and 89 are provided with suitable events and dwells to give locking bar 77 four principal movements in proper sequence and combination.

In the description set forth in U. S. Patent No. 2,394,765 it was assumed that the keying mechanism remained stationary during the transmission or reception of each sign. This made it possible to use the simple mechanism shown in that patent for setting up ciphered signal combinations. With the present keying mechanism however in which the key wheels 1 through 5 may and usually do change their positions during the main part of the operating cycle a contacting mechanism similar in principle to that used for guide arms 40 through 44 may be employed. For this purpose ciphering links 68 through 72 are mounted individually rotatably on shaft 107 which is journaled in an elongate bearing support 108. This construction together with the slot 14a permits the linkage assembly to be moved horizontally to and from the key wheels 1 through 5. Twin bell-crank levers 109 and 110 are keyed to a common shaft 111. Shaft 107 is engaged at its ends by bifurcations 112 and 113 of one arm each of bell-cranks 109 and 110. In the starting position shown in Fig. 1 a spring 114 urges bell-cranks 109 and 110 together with shaft 107 to the right. The upper parts of links 68—72 are provided with projections 115 which co-operate with pins 64 of key wheels 1–5. This part of links 68 through 72 correspond to links 15a of the above United States patent, the pins 64 corresponding to the events on cam surface 16a. The lower ends of the links 68 through 72 are connected to five links 14a of the teletypewriter or teleprinter printing or keying mechanism previously described. Slide bar drum shaft 39 has a crank arm 116 keyed thereto with a projecting pin 117 arranged to impinge arm 109b of bell-crank 109 just before slide bar drum 8 completes an operative revolution. This action causes bell-cranks 109 and 110 to rotate momentarily counter-clockwise through a small angle and to return under the action of spring 114 as soon as pin 117 clears arm 109b. During this short interval those links 68 through 72 whose projections 115 strike against active pins 64 will be rotated clockwise through a small angle, those links 14a connected to the rotated links 68 through 72 and the corresponding projections 5a being moved to the left, so that the relative position of the affected projections 5a with respect to their corresponding projections 4a become that shown in Fig. 2. Links 68 through 72 are held in position by friction bias spring 118 in the form of a bowed leaf as shown in Fig. 3, and form the proper relationship between the five pairs of projections 4a, 5a, which control the basket printer shown in Fig. 2.

After the transmission or reception of a signal or character represented by the previous arrangement of links 68 through 72 they are all brought into line and made ready for the next contacting operation by bell-crank 119 mounted on shaft 111 and having a transverse bar 119b on one arm for lining up the links 68 through 72 between contacting operations by pressing against the bottoms of the links just before pin 117 strikes arm 109b. The other arm of bell crank 119 is bifurcated as at 120 to receive pin 121 on lever 122 which is spring biased counter-clockwise. Short shaft 123 has lever 122 keyed to one end and lever 124 keyed to the other end. Pin 117 on lever 116 also strikes lever 124 and operates return bar 119b.

The operation of the cryptographic device is as follows:

In the starting position locking bar 77 is in its upper right hand position and guide arms 40 through 44 pivoted on shaft 45 are free to take a right or left position as determined by the inactive and active pins 64, respectively, on key wheels 1 through 5. At this stage it is possible for the operator to adjust the key wheels 1 through 5 to a desired starting position by hand at the beginning of the transmission or reception of a message. Locking bar 77 is moved to the left by hand, freeing all the guide arms 40 through 44 from contact with the active pins 64 and leaving the key wheels 1 through 5 free to be rotated by hand. This adjustment includes both the angular positions of the key wheels and the selection of which of the pins 64 shall be active. It is to be understood that a preselected starting position for key wheels 1 through 5 and pins 64 is necessary to the proper functioning of the invention and is an integral part of the secrecy integrity of the device. It is therefore a factor to be guarded with care to prevent compromise and changed as frequently as practicable if maximum secrecy is to be obtained.

Key wheels 1 through 5 serve two essentially different purposes. On the one hand they can and usually do act on one or more of the links 68 through 72 which cooperate with the telewriter mechanism 1a through 40a, each link 68, 69, 70, 71 and 72 corresponding to an individual lever 15a in Fig. 2. Here the pins 64 determine whether or not the signals to or from the telewriter assembly shall be transmitted unchanged or changed and if changed to what degree. On the other hand, the pins 64 determine by their action on guide arms 40 through 44 and the slide bars 9 through 38 of slide bar drum 8 which in turn act on intermediate wheels 46 through 50 meshing with spur gears 59 through 63, respectively, the amount of movement or displacement of each of the individual key wheels 1 through 5 are to experience before each signal combination in the telewriter 1a through 40a is set up for transmission or reception. The working position of pins 64 with respect to the projections 115 of the links 68 through 72 is at the right side of the key wheels 1 through 5 in Fig. 1 and with respect to projections 75 of guide arms 40 through 44 and slide bar drum 8, on the left side of the key wheels.

Figure 7:
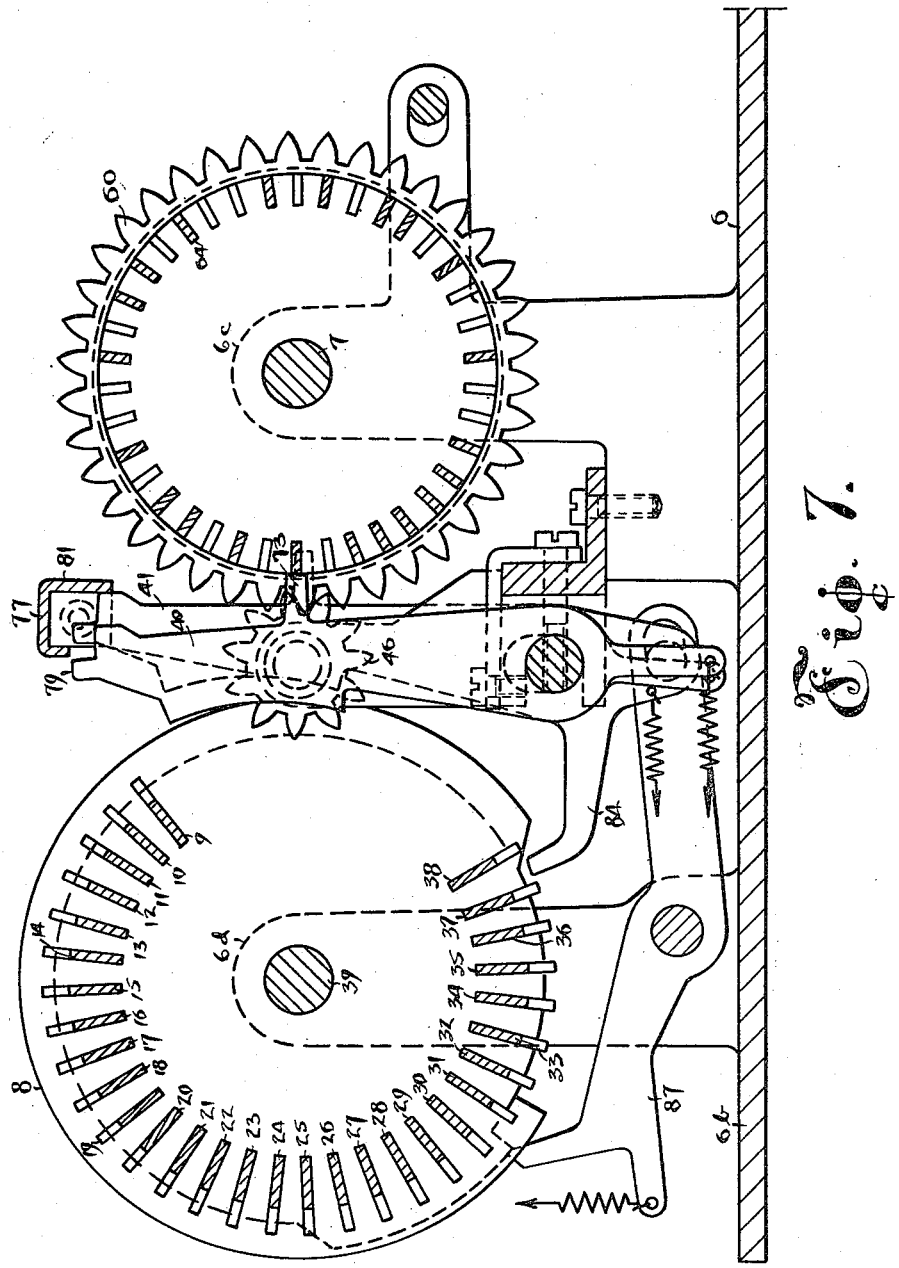
Fig. 7 is a sectional view taken along line B—B of Fig. 3 with the locking bar in starting position.
Figure 8:
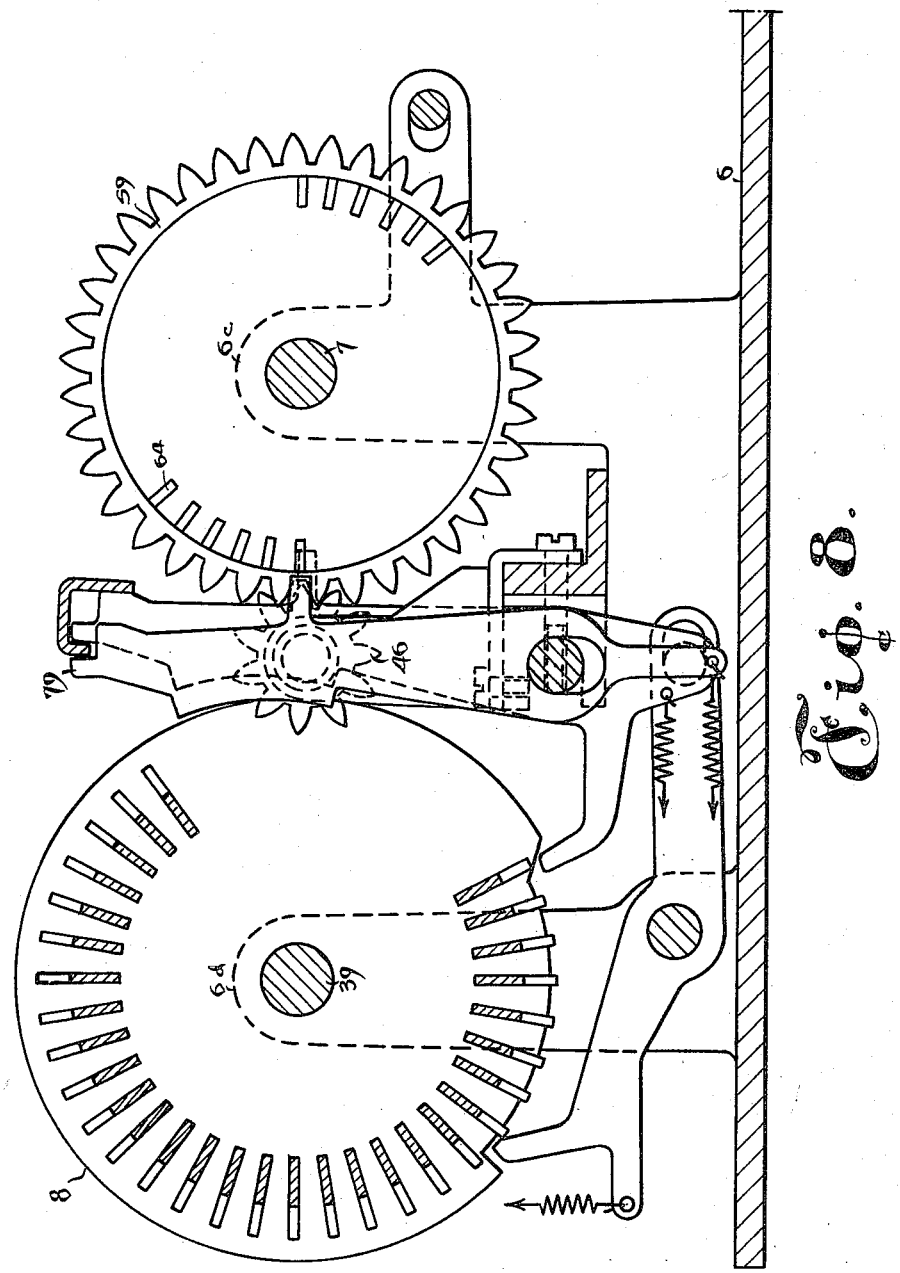
Fig. 8 is a sectional view taken along line B—B of Fig. 3 with the locking bar in lower right hand position.
Figure 9:
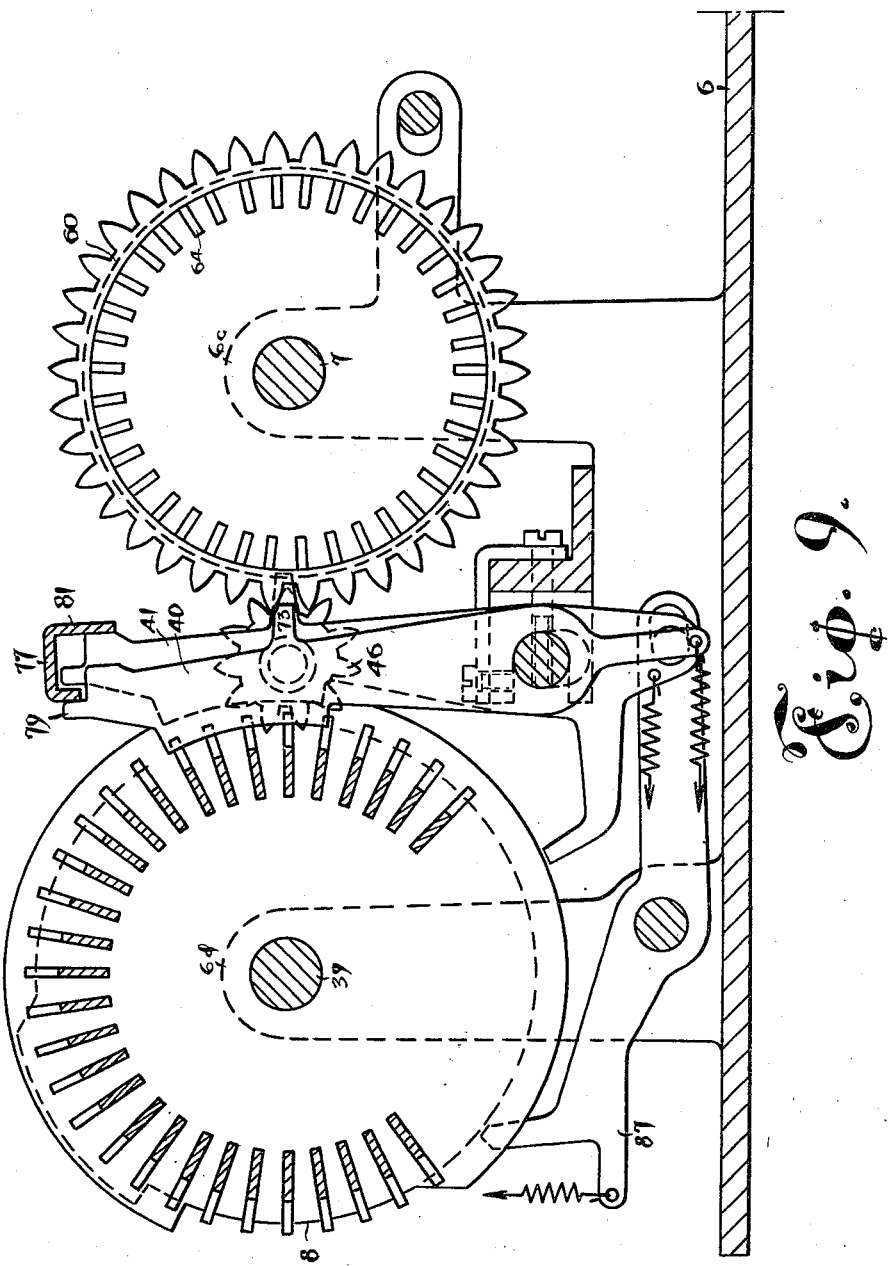
Fig. 9 is a sectional view taken along line B—B of Fig. 3 with the locking bar in lower left hand position.
Figure 10:
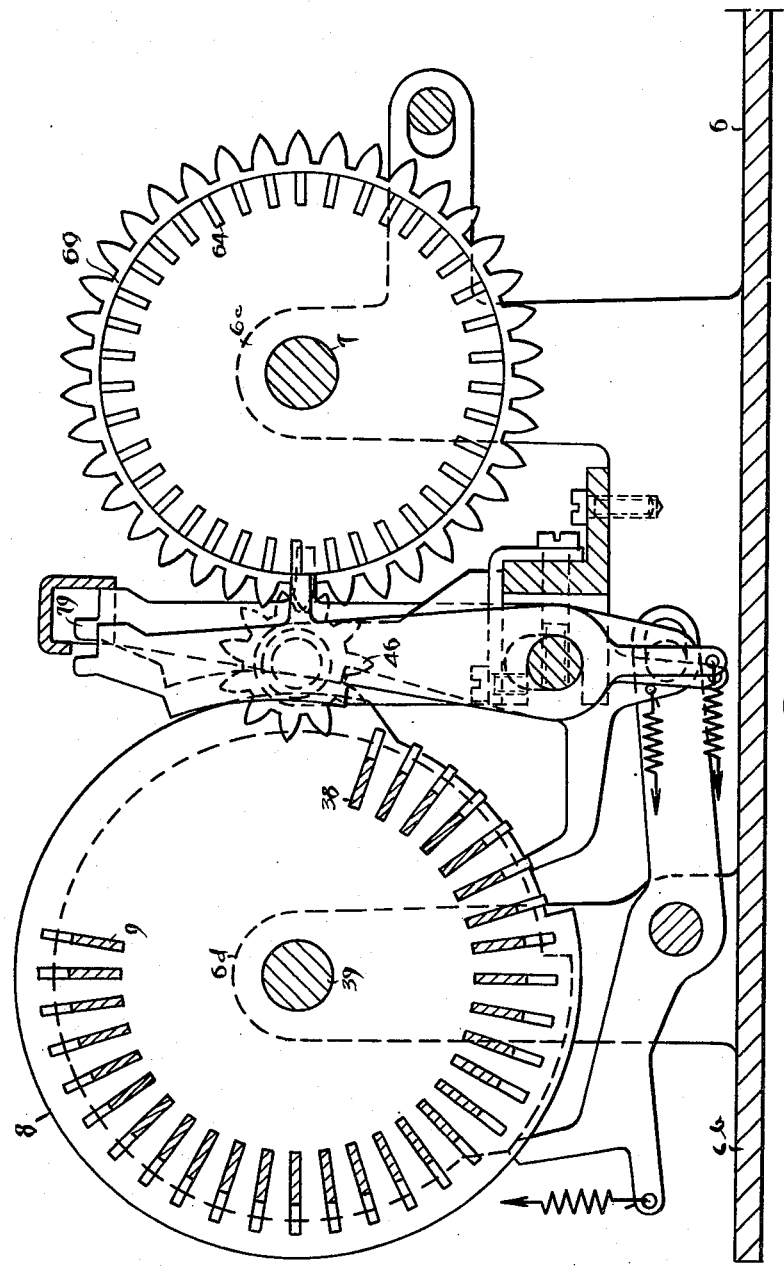
Fig. 10 is a sectional view taken along line B—B of Fig. 3 showing the position of the locking bar immediately before the slide bar drum has completed its rotation.

Slide bar drum 8 makes a complete revolution for each sign which is enciphered or deciphered. As the drum 8 begins to rotate locking bar 77 drops down into locking position and pivots the guide arms 40 through 44 away from key wheels 1 through 5 and toward the slide bar drum 8. This action occurs step by step. Locking bar 77 first drops to the lower right position shown in Fig. 8 with front edge 80 just to the right and abutting the locking projections 79 of those guide arms whose projections 73 have encountered active pins 64 on the key wheels 1 through 5, as shown in Figs. 7 and 8. Immediately thereafter and before any of the driving teeth or projections 75 of the slide bars begin to mesh with intermediate wheels 46 through 50, locking bar 77 moves over to its lower left position and pivots with it all of the guide arms 40 through 44, maintaining their relative positions. Those guide arms whose projections 73 encountered active pins 64 are moved forward to the left by the action of front edge 80 on the projections 79, so that their oblique guide surfaces 74 assume active positions closely adjacent slide bar drum 8 in which they can act upon the long projections or lugs 76 on the slide bars 9 through 38. Those remaining guide arms 40 through 44 whose projections 73 did not happen to encounter an active pin 64 will have their lugs or projections 79 to the right of front edge 80 and will be pivoted to the left by rear edge 81 of locking bar 77. These last guide arms will be moved away from key wheels 1 through 5, but not far enough to act on projections 76 of slide bar drum 8. Locking bar 77 moves downward under the action of spring biased lever 87 which rocks clockwise because of the sudden event or drop in cam 89. Locking bar 77 is then pivoted to the left by the subsequent rise in cam 85 which moves lever 84 counterclockwise.

Locking bar 77 and guide arms 40 through 44 retain the above position during the rotation of drum 8 because the very long dwells on cams 85 and 89 hold levers 84 and 87 in position. As slide bar drum 8 is rotated slide bars 9 through 38 are moved past the guide arms 40 through 44 and those bars having projections 76 which happen to encounter guide surfaces 74 are pushed to the left. As drum 8 continues to rotate the slide bars are moved past the intermediate wheels or pinions 46 through 50 and those pinions which encounter one or more projections 75 are rotated one or more steps. Each key wheel 1 through 5 is rotated the number of steps corresponding to those of that intermediate pinion 46, 47, 48, 49 or 50 which meshes with its spur gear 59, 60, 61, 62 and 63, respectively. Of course if one of the intermediate pinions such as 47 should not encounter a projection 75 it and the corresponding key wheel 2 would remain stationary for that signal. As the drum 8 rotates those slide bars 9 through 38 which have gone past intermediate wheels 46 through 50 are acted upon by cam surface 91 of block 90 and returned to their normal right position unless, of course, they are already there.

As soon as all of the slide bars have moved past the guide surfaces 74 cam follower 84b of lever 84 reaches the end of the long dwell on cam 85 and meeting the event 85b is rotated sharply clockwise by its spring bias. This action rotates guide arms 46 through 50 away from drum 8 and toward the main key wheels 1 through 5. Shortly thereafter a similar drop or event in cam 89 permits clockwise movement of lever 87 in response to its spring bias. This action raises locking bar 77 to its upper right position and releases guide arms 46 through 50, permitting them to be rotated clockwise toward key wheels 1 through 5 under the action of bias springs 78.

Further rotation of shaft 39 and drum 8 causes pin 117 on lever 116 to rotate levers 124, shaft 123 and lever 122 counterclockwise and bell-crank 119 clockwise through pin 121. Transverse bar 119b lines up the links 68 through 72 and erases the former setting. As pin 117 passes lever 124 bar 119b is moved away from links 68 through 72 under the action of bias spring 122b on lever 122. Pin 117 then strikes arm 109b and rocks bell-crank 109 counter-clockwise, carrying shaft 107 and the links 68 through 72 and their attached members 14a toward the key wheels. Those links whose projections 115 contact active pins 64 are rotated clockwise about shaft 107 and produce the relationship between projections 4a and 5a shown in Fig. 2 when pin 117 leaves arm 109b and spring 114 restores bell-crank 109 and shaft 107 to their former positions. This action establishes the ciphering combination for the transmission or reception of the next sign. Guide arms 46 through 50 have already assumed their next positions under the action of their bias springs 78, and those active pins 64 encountered by projections 73 and the device is ready for another cycle initiated by the clockwise rotation of cam follower 87b under the combined action of its bias spring and the sudden drop 89b in cam 89.

Normally the slide bars 9 through 38 are provided with one driving tooth or projection 75 on each bar, and if, for example, the displacing possibilities are equally divided over all five key wheels 1 through 5, the driving teeth 75 on the first six slide bars, 9 through 14 as shown in Fig. 6, are positioned to engage the intermediate wheel or pinion 46 which meshes with spur gear 59 of key wheel 1. In the same way the next group of seven slide bars 15 through 21 have their driving teeth 75 positioned to engage intermediate wheel 47 to drive key wheel 2 and so on. With such an arrangement for a certain combination of positions of key wheels 1 through 5 all five guide arms 40 through 44 could remain in their inactive positions, leaving key wheels 1 through 5 stationary. Therefore, at least one of the slide bars 9 through 38 must have a driving tooth 75 positioned so that it will mesh with one of the intermediate wheels 46 through 50 when that slide bar remains in its normally inactive or right hand position unaffected by guide portions 74. Whatever the arrangement selected at least one key wheel should move for each sign enciphered or deciphered.

One or more projections 76 may be placed on each slide bar so that two or more key wheels may act independently on the same slide bar over guide arms 40 through 44. Of course more than one driving tooth 75 may also be placed on the same slide bar.

One arrangement of driving teeth 75 and projections 76 are shown in Fig. 6. There are in all thirty-two displacement combinations among the five guide members 40 through 44 capable of taking one of two positions. Examples of such combinations with the bars shown are as follows:

1. With the guide arms 42 and 43 of key wheels 3 and 4 in active positions the key wheel 1 will be displaced four steps and the remaining key wheels 2, 3, 4 and 5 will be displaced three, one, two and three steps respectively.

2. With guide arms 40, 42 and 44 of key wheels 1, 3 and 5 in active position, key wheels 1 through 5 will be displaced three, four, three, four and three steps, respectively.

3. With guide arms 41, 42 and 43 of key wheels 2, 3 and 4 in active position, key wheels 1 through 5 will be displaced four, three, two and four steps, respectively.

4. With guide arms 40 and 44 of key wheels 1 and 5 in active position, the key wheels 1 through 5 will be displaced two, three, four and two steps, respectively.

The recurrence factor can be increased by adding other guide arms and key wheels or more slide bars. Another way to increase this factor is to make driving teeth 75 and projections 76 movable in the same or similar way as pins 64. Teeth 75 and projections 76 could be shifted rather than made active or inactive in the sense these terms are applied to pins 64.

In Figs. 11 and 12 each slide bar 92A, 92B through 96A, 96B is provided with five arms 97 which are rotatably mounted on pivots 98. The arms 97 can assume either of the two positions $a$ or $b$ as shown in Fig. 11. Those arms 97 which are in position $a$ may be termed active and may be acted upon by the guide portions 74. Those arms 97 which are in position $b$ may be termed inactive and will not be acted upon by the guide portions 74. Arms 97 are locked in either position $a$ or $b$ by a bias spring 100 having a bent portion 101 in a depression 102 in the slide bars 92A, 92B through 96A, 96B. Spring 100 is flat or leaf and is provided with two positioning holes 103 and 104 arranged to receive and hold punched projection 105 of the arms 97 when they are rotated about pivots 98.

In Fig. 11 bars 92A, 93A, 94A, 95A and 96A are "normal" type A bars and their driving teeth 106 will engage and rotate intermediate wheels 46 through 50. The alternate or type B bars will engage the intermediate wheels when in normally "inactive" or right position.

Just as thirty-two guide arm relative position combinations can be obtained so also can thirty-two ciphering link 68 through 72 relative position combinations be obtained. Through a suitable choice of the number of pins 64 on the key wheels and their active arrangement, of driving teeth 75 and operating projections 76 on the slide bars an exceedingly irregular displacement of the key wheels is obtained with a repetition factor so small that from a practical standpoint the number of different combination sequences for the enciphering and deciphering of transmitted and received telewriter signal impulses may be regarded as substantially unlimited. Certainly a repetitive pattern is not to be found in any normal message or even combination of messages as it covers a sequence of many million signs.

The present invention may be employed for both coding and decoding. Keying mechanisms such as those described above produce a displacement or key series comprising an arrangement of the key wheels. When the keying members comprising the key wheels are all set in a certain defined manner with selected pins in predetermined positions and the key wheels in selected relative and group positions, as decided upon in advance by the correspondents, they will produce a certain defined displacement or key series which, as noted above, can be, and in the present device is, a very large sequence of characters comprising a number with an upper two digit exponent. When a message has been enciphered by one of the correspondents and is to be deciphered by another correspondent or correspondents, the same key series or arrangement of key wheels etc. in the device must be used for the transformation of the message in question, first for its enciphering and then for its deciphering. In general, the manner in which this is accomplished depends upon the particular cipher device employed and is independent of the keying mechanism itself.

Figure 1:
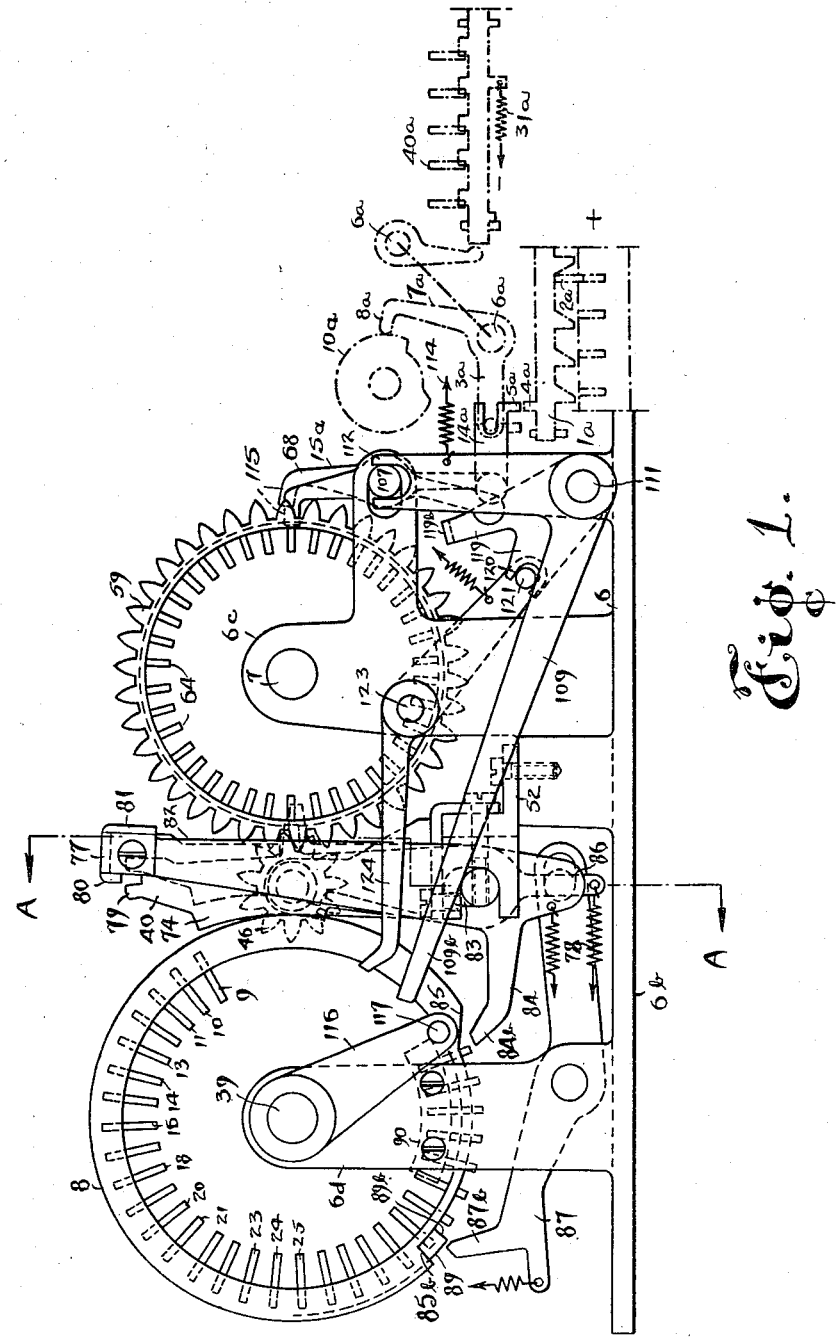
Fig. 1 is a right side elevation of one form of the invention.
Figure 2:
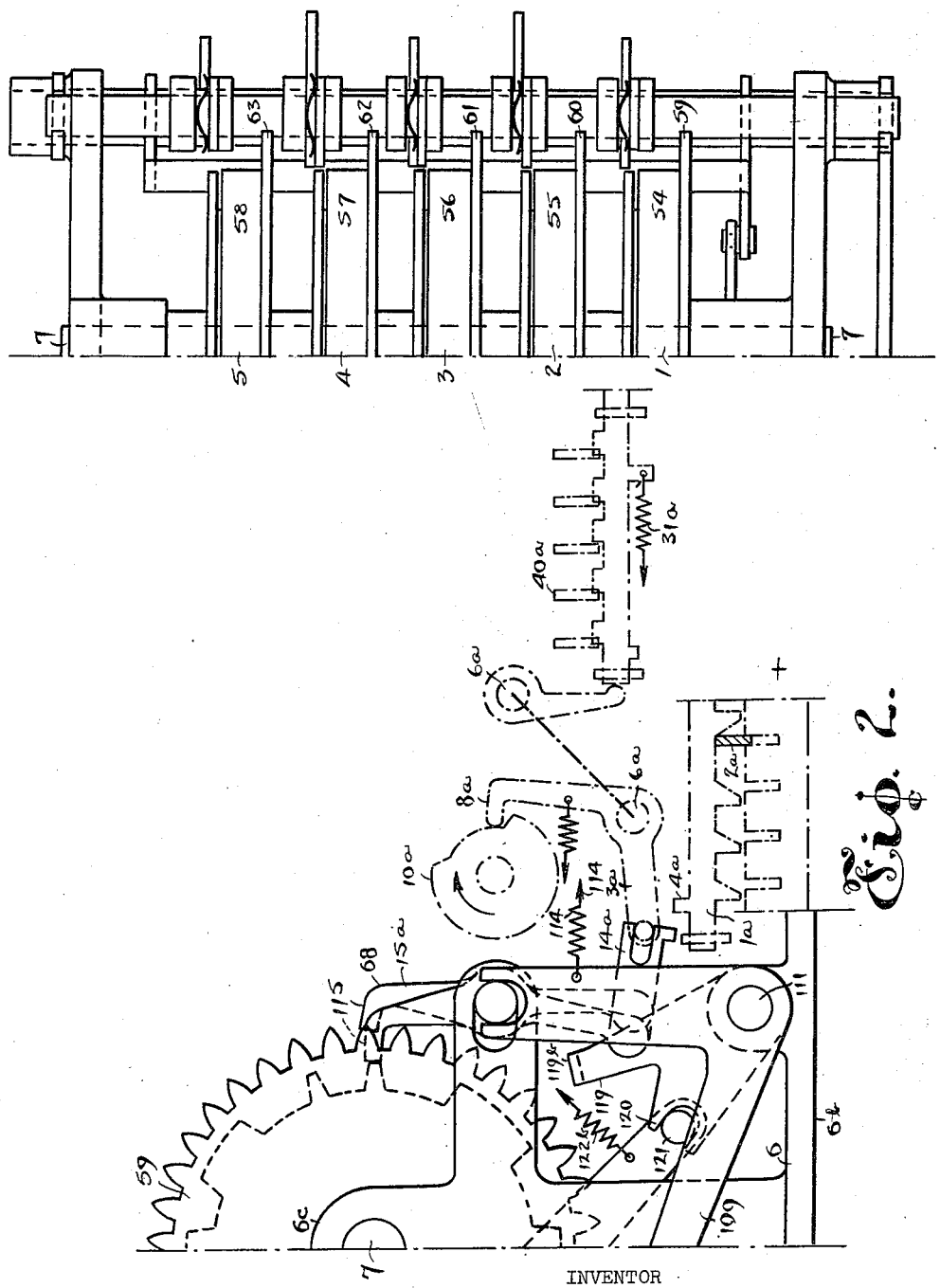
Fig. 2 is a schematic showing of a mechanism to be controlled by the invention.

In the form of the invention shown in Figures 1 and 2, the keying mechanism acts on the five-impulse combinations used for the representations of the letters and other signs transmitted over teleprinter circuits. If the two positions of the five bars 1a are designated by the signs + and —, with the two positions of the links 14a indicated in the same manner, it readily appears that the letters and other signs contained in the message will be represented by a group comprising a sequence of five positive and negative indications, depending upon whether the bars 1a are in the right or left positions, respectively.

For example, the word PARIS might be represented by the following series of group sequences: —+ +—+; ++———; —+—+—; —++——; +——+——. The corresponding key series employed for both enciphering and deciphering the message may be represented also by these negative and positive indications, the pertinent part of which may be taken as SLMUC and represented by the following groups: +—+———; —+———+; ——+++; +++——; —+++—.

When the bar 1a is in the left or negative position, then the action on the bar 31a will be such that it will take the negative position; if the link 14a in its negative position, the bar 31a will also take the negative position. On the other hand, where the bar 1a takes a positive position, and the link 14a takes the negative position, or vice versa, then the bar 31a will take a positive position.

Reverting to the enciphering and deciphering of the message "PARIS" with the key series "SLMUC" we find:

A. Enciphering:

|  | P | A | R | I | S |
|---|---|---|---|---|---|
| Message | —++—+ | ++——— | —+—+— | —++—— | +—+—— |
|  | S | L | M | U | C |
| Key | +—+—— | —+——+ | ——+++ | +++—— | —+++— |
| Resulting cipher transmitted | ++——+ | +———+ | —++—+ | +———— | ++—+— |

B. Deciphering:

```
                    W        Z        P        E        J
Received
   cipher    ++--+   +----+   -++-+   +----    ++-++
                S        L        M        U        C
Key          +-+--   -+--+    --+++   +++--    -+++-
Original
  message    -++-+   ++---    -+-+-   -++--    +-+--
                P        A        R        I        S
```

It will be seen from the above that with the devices of both correspondents adjusted to the same key SLMUC by the predetermined seting of the key wheels 59—63 and their respective lugs 64, together with the adjustment of slide bars 9—38 in drum 8 on both their instruments, which are then identical, the device can be used for both enciphering and deciphering operations.

The operational sequence is as follows:

1. The sender depresses the clear key sequence spelling PARIS at the keyboard of printer basket 40a.

2. The selected key wheel setting, etc. alters PARIS, as shown at A above, by adding the key SLMUC.

3. The combination of the clear message PARIS and the key SLMUC produces the encoded message WZPEJ at the output of the device. These letters WZPEJ are received and the receiver depresses the corresponding letter keys of the keyboard of printer basket 40a.

4. The selected key wheel setting, etc. which is the same as at 2 above, alters WZPEJ by adding the key SLMUC.

5. The combination of the enciphered message WZPEJ and the key SLMUC produces the original clear message PARIS at the output of the device.

6. The output may comprise an indicating disc 48 or a tape printing wheel 53, such as is shown at Figure 2 of my Patent No. 2,089,603.

Again, the deciphered pulses may be supplied directly to a typewriter, as is well known in the teletypewriting art. Although enciphering and deciphering are sequential rather than simultaneous operations as far as a single cipher device is concerned, the operations can be simultaneous when a number of cipher devices are adjusted for the same key and connected to the same teletypewriter circuit. As the clear message is keyed or typed into the enciphering sender device letter-by-letter, the message is enciphered, transmitted to the receiving device or devices where it is deciphered letter-by-letter and typed or printed in clear as received message.

The above disclosure presents certain means by which the invention may be practiced, but it is not intended to limit the appended claims to the specific means shown. The invention is presented in the claims by terms intended to be generic and to include all those means by which another might seek to practice the invention by following the teaching herein. Other means by which the invention may be practiced would comprise the use of electrical contacts on which the key wheel pins 64 could act for modifying cipher circuits. Slide bar drums and key wheels can be divided into two or more interacting groups. There can be separate groups of slide bars as well as key wheels. The basic concept of interaction between key wheels and slide bar drum whereby the key wheels influence their own displacement may take many forms. The key wheels have the dual function of interacting with the slide bar drum to determine their own displacement and to act on means which effect the ciphering operation either mechanically by action on levers which can take a plurality of positions or electrically by action on contacts which control single or multiple circuits which can be changed in a plurality of ways. The key-wheel-slide bar drum combination can be used for displacement of electrical ciphering means such as cylinders or cams acting on single or multiple contacts, mechanical means such as levers or cams or on reproducing means such as type wheels.

While I have described above what are at present believed to be the preferred forms of my invention, it will be understood that various changes may be made therein by those skilled in the art without departing from the spirit of the invention.

I claim:

1. A ciphering device comprising a group of main key wheels, a group of intermediate secondary wheels, a slide bar drum, variable position means having movable elements, said elements being individually movable in response to said key wheels, means to lock said elements in a group relation determined by said key wheels, said variable position means acting upon said slide bar drum to produce a variable tooth gear acting upon selected secondary wheels, said secondary wheels acting upon said main key wheels to produce an irregular displacement thereof of a very large number of combination sequences.

2. In combination in a cipher device, a first group of means for enciphering or deciphering intelligence, a second group of means comprising movable members for receiving enciphered intelligence from said first group and transmitting it to a third group of means, and means interacting between said third group and said first group to affect the enciphering and deciphering of intelligence by said first group.

3. The combination set forth in claim 2, locking means for said second group whereby the space relation of the members of the group may be maintained for that portion of the operation cycle in which enciphered intelligence is transmitted to said third group.

4. In combination in a cipher device, a group of key wheels each having a series of teeth and a series of contact means thereon, enciphering means arranged to be affected by said contact means and bodily movable into and out of contact therewith as a group having fixed relative positions and means acted upon by said enciphering means and acting in turn upon said teeth to affect the position of said key wheels.

5. In combination in a cipher device, a group of key wheels each having a series of teeth and a series of movable pins thereon, a group of pivoted guide arms each having a projection to be acted upon by said movable pins to adjust the relative positions of said arms to correspond with active and inactive pins, means to lock said arms in adjusted position, cam-like surfaces on said arms, means to pivot said arms as a locked group toward a slide bar drum, said drum having a series of slide bars with projection thereon capable of being acted upon by the cam-like surfaces of said guide arms to move certain of said bars and form a variable toothed gearing arrangement capable of causing the teeth of said gear wheels to change their relative positions and produce an irregular displacement thereof of a very large number of combination sequences.

6. In combination in a cipher device, a group of enciphering wheels having driving means and contact means thereon, a group of individually movable means movable as a group with fixed relative positions controlled by said contact means, a second enciphering means controlled by said group of movable means and means connecting said second enciphering means and said drive means of said group of enciphering wheels whereby to change their relative position and produce an irregular displacement thereof of a very large number of combination sequences and intermittent locking means for said group of movable means.

7. In combination in a cipher device, a first group of key wheels having contact means thereon, a group of movable means controlled by said contact means, an enciphering slide bar drum controlled by said movable means and a second group of wheels controlled by said slide bar drum and arranged to produce an irregular displacement of said first group of key wheels of a very large number of combination sequences, locking means for said group of movable means and means to actuate said locking means for a part of the operating cycle of the combination.

8. In combination a cipher device comprising means for enciphering intelligence, variable event adjustment means and event sequence means controlled by said variable event means to produce a large number of non-recurring cipher combination sequences wherein said position group sequence means comprises a variable event members and elements controlled thereby for intermittently reacting on said means for enciphering intelligence.

9. The combination set forth in claim 8, said variable position group means comprising pivoted cam members bodily movable as a group into and out of active relation with said means for enciphering intelligence and said variable event means.

10. The combination set forth in claim 9, locking means for said variable position group means to maintain the relative position of the members of the group for varying said variable event means under the control of said means for enciphering intelligence.

11. In combination a cipher device comprising a group of rotatable wheels arranged to encipher a signal and rotatable means individually controlled by the wheels and movable as a group out of engagement therewith for altering the relative positions of the rotatable wheels to produce an irregular displacement thereof of a very large number of combination sequences.

12. In combination a cipher device comprising movable elements having a dual position means for enciphering intelligence, variable event adjustment means and event sequence means controlled by said first means and a fourth means controlled thereby at least in part and reacting on said first means for altering the action of said first means, said event sequence means having portions movable sequentially into and out of engagement with said first and said second means repetitively and reacting with each successively to produce a large number of non-recurring cipher combination sequences.

13. The combination set forth in claim 12 said event sequence means having at least one movable portion, locking means for said movable portion of said event sequence means acting to maintain the relative positions thereof when moving from one engagement position to another.

14. The combination set forth in claim 13, cam means actuating said locking means.

15. In combination a cipher device comprising means for enciphering or deciphering intelligence and secondary means which is adjusted by said means and a cipher store controlled by said secondary means which is presettable to a selected combination of positioned projecting actuating means and in turn adjusts said first means whereby to produce a repetitive cycle of non-recurring sequences of greater than a million units.

16. In combination in a cipher device, a group of main key wheels having movable elements mounted thereon, a group of pivoted guide arms positioned to be engaged by said movable elements, means to maintain the relative positions of said guide arms with respect to each other about a common axis of rotation, a slide bar support having slide bars mounted thereon, said guide arms being pivotally mounted for movement into engagement with said slide bars to cause them to form a variable tooth gear.

17. The combination set forth in claim 16, means to restore said slide bars to an inactive position.

18. In a cipher device, input signal means, a group of main key wheels actuated by said input means, enciphering means on said wheels, a variable cipher store, variable event adjustment means comprising elements selectively positioned by said enciphering means and arranged to adjust said cipher store, means to clear said cipher store of selected ciphering adjustments and means actuated by said cipher store for exerting a controlling displacement action on said variable event adjustment means.

19. The combination set forth in claim 18 in which said cipher store comprises a variable tooth gearing means.

20. In combination in a cipher device, signal means, a group of movable event sequence means operably associated with said signal means, elements carried by each said sequence means movable into and out of actuating position, a group of movable guide means comprising one means for each sequence means, said guide means being positioned to be acted upon by said elements, a slide bar drum positioned to be acted upon by said group of guide means, means to lock said group of guide means in a succession of selected relative positions with respect to each other, said positions being selectively of a group comprising active and inactive positions, means to move said guide means as a locked group into and out of engagement with said slide bar drum, said means to move being controlled by said drum.

21. In combination in a cipher device comprising a first group of means to deliver and receive intelligence, a second group of means having movable parts selectively adjustable to active and inactive positions, the adjustment of said parts comprising at least in part a cipher key for said cipher device which, where acted upon by intelligence in the form of a clear message, acts to encipher said message and when acted upon by intelligence in the form of an encoded message from a similar cipher device having the same arrangement of parts comprising the cipher key acts to decipher said intelligence, a third group of means for transferring intelligence, means to further encipher said intelligence received from said transfer means and transfer it to a fourth group of means which cooperates with said second groups and affects the action of said second group.

22. The combination set forth in claim 11, said rotatable means comprising guide arms movable relative to each other and as a group with fixed positions relative to each other.

23. The combination set forth in claim 11, said rotatable means comprising a drum having slide bars thereon.

24. The combination set forth in claim 11, said rotatable means comprising a sub-combination of guide arms, a drum having slide bars mounted thereon for movement in translation along the axis of rotation of said drum and for rotation with the drum about the drum axis.

25. The combination set forth in claim 11, said rotatable means comprising a drum having slide bars thereon, said slide bars having movable projections thereon.

26. The combination set forth in claim 11, and means controlled at least in part by said rotatable means for acting upon said wheels in a predetermined operational sequence.

References Cited in the file of this patent

UNITED STATES PATENTS

| | | |
|---|---|---|
| 1,912,983 | Jipp et al. | June 6, 1933 |
| 1,990,380 | Hopkins et al. | Feb. 5, 1935 |
| 2,089,603 | Hagelin | Aug. 10, 1937 |
| 2,504,044 | Potts | Apr. 11, 1950 |
| 2,512,734 | Beccio | June 27, 1950 |
| 2,522,461 | Potts | Sept. 12, 1950 |